(12) United States Patent
Tausworthe et al.

(10) Patent No.: US 8,984,564 B2
(45) Date of Patent: Mar. 17, 2015

(54) METHOD AND SYSTEM FOR DYNAMICALLY INSERTING CONTENT INFORMATION INTO A MOBILE TV APPLICATION

(75) Inventors: Robert D. Tausworthe, Santa Clara, CA (US); Vernon Carter Marshall, San Francisco, CA (US)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 104 days.

(21) Appl. No.: 13/316,296

(22) Filed: Dec. 9, 2011

(65) Prior Publication Data

US 2012/0180085 A1 Jul. 12, 2012

Related U.S. Application Data

(60) Provisional application No. 61/422,108, filed on Dec. 10, 2010.

(51) Int. Cl.
| | |
|---|---|
| *H04N 7/10* | (2006.01) |
| *H04N 7/025* | (2006.01) |
| *H04N 7/16* | (2011.01) |
| *H04N 21/414* | (2011.01) |
| *H04N 21/45* | (2011.01) |
| *H04N 21/61* | (2011.01) |
| *H04N 21/81* | (2011.01) |
| *H04N 21/438* | (2011.01) |

(52) U.S. Cl.
CPC ..... *H04N 21/41407* (2013.01); *H04N 21/4516* (2013.01); *H04N 21/6112* (2013.01); *H04N 21/8166* (2013.01); *H04N 21/4383* (2013.01); *H04N 21/4524* (2013.01); *H04N 21/4532* (2013.01); *H04N 21/812* (2013.01)

USPC .............................. 725/62; 725/34; 725/35

(58) Field of Classification Search
CPC ................. H04N 21/41407; H04N 21/4516; H04N 21/4524; H04N 21/4532; H04N 21/6112; H04N 21/812; H04N 21/8166
USPC ................... 725/32–36, 62; 455/403, 414.1
See application file for complete search history.

(56) References Cited

U.S. PATENT DOCUMENTS

| 7,110,714 B1* | 9/2006 | Kay et al. ................... 725/36 |
| 7,376,414 B2* | 5/2008 | Engstrom ................ 455/414.3 |
| 8,196,159 B2* | 6/2012 | Jeong ........................... 725/29 |
| 2003/0120541 A1* | 6/2003 | Siann et al. ................. 725/32 |

(Continued)

*Primary Examiner* — Randy Flynn
(74) *Attorney, Agent, or Firm* — Kilpatrick Townsend & Stockton LLP

(57) ABSTRACT

A method operates a mobile communication device configured for outputting a television application and displaying selected content within a television environment of the mobile communication device. The method includes initiating a TV application using a user interface coupled to the mobile communication device. The method also includes capturing a television signal using a tuning device provided in the mobile communication device. The television signal is one of a plurality of television signals from respective television channels. The method further includes outputting a TV program associated with the television signal for the captured television channel on a display of the mobile communication device. Additionally, the method includes retrieving a configurable content object from a database provided within the mobile communication device. The configurable content object is one of a plurality of configurable content objects numbered from 1 through N, where N is an integer greater than 1.

31 Claims, 6 Drawing Sheets

(56) References Cited

U.S. PATENT DOCUMENTS

| | | | |
|---|---|---|---|
| 2003/0132819 A1* | 7/2003 | Sim | 333/175 |
| 2008/0134260 A1* | 6/2008 | Glassman et al. | 725/104 |
| 2008/0207182 A1* | 8/2008 | Maharajh et al. | 455/414.1 |
| 2008/0256574 A1* | 10/2008 | Lee et al. | 725/32 |
| 2009/0239514 A1* | 9/2009 | Kenagy et al. | 725/34 |
| 2011/0088061 A1* | 4/2011 | Rowe | 725/35 |

\* cited by examiner

Placement in channel lineup, can update to a different promotion or serve multiple ads

METHOD AND SYSTEM FOR DYNAMICALLY INSERTING CONTENT INFORMATION INTO A MOBILE TV APPLICATION

CROSS-REFERENCES TO RELATED APPLICATIONS

This application claims priority to U.S. Provisional Patent Application No. 61/422,108, filed Dec. 10, 2010, which is incorporated by reference herein for all purposes.

STATEMENT AS TO RIGHTS TO INVENTIONS MADE UNDER FEDERALLY SPONSORED RESEARCH AND DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention is directed to mobile television. More specifically, embodiments of the present invention provide a system for dynamically inserting content information into mobile TV applications. Based on various criteria (such as user history), content information such as relevant commercials are dynamically inserted into a mobile TV application, and such content information is displayed when a user changes channel and/or perform other actions. There are other embodiments as well.

Over the last decades, multimedia contents have become more a more ubiquitous on mobile devices, such as mobile phone. More people are streaming music and video contents using their mobile phones for personal consumption. Streaming video contents over wireless network is often inefficient, as transferring large video files or streams often cog up the wireless network.

One efficient way of delivering video contents has been broadcasting mobile television signals to mobile TV enabled devices. For example, a mobile phone includes require hardware modules for receiving television signals and display mobile TV broadcast.

To obtain revenue from mobile TV broadcasting, it is often necessary to broadcast advertising and other types of contents. Unfortunately, conventional techniques are inadequate.

It is therefore desirable to have improved system and method for inserting contents to mobile TV applications.

BRIEF SUMMARY OF THE INVENTION

The present invention is directed to mobile television. More specifically, embodiments of the present invention provide a system for dynamically inserting content information into mobile TV applications. Based on various criteria (such as user history), content information such as relevant commercials are dynamically inserted into a mobile TV application, and such content information is displayed when a user changes channel and/or perform other actions. There are other embodiments as well.

In various embodiments, the present invention provides a mobile TV application that dynamically updates multimedia contents that users can interact with and consume. The multimedia contents can be received over the air from television broadcasting channels, home network, the internet, and other sources. The selection of multimedia contents can be based on user preference, preset value, previous viewing history, and others. For example, the selection of multimedia content can be stored and processed in a remote database server.

According to an embodiment, the present invention provides a method for operating a mobile communication device configured for outputting a television application and displaying selected content within a television environment of the mobile communication device. The method includes initiating a TV application using a user interface coupled to the mobile communication device. The method also includes capturing a television signal using a tuning device provided in the mobile communication device. The television signal is one of a plurality of television signals from respective television channels. The method further includes outputting a TV program associated with the television signal for the captured television channel on a display of the mobile communication device. Additionally, the method includes retrieving a configurable content object from a database provided within the mobile communication device. The configurable content object is one of a plurality of configurable content objects numbered from 1 through N, where N is an integer greater than 1. The method further includes associating the configurable content object to one of a plurality of the television channels using one of a plurality of presentation criteria. The plurality of presentation criteria is provided within the mobile communication device. The method includes outputting content from the configurable content object when a user selects a channel associated with the configurable content object. The channel is one of the plurality of channels.

The TV application comprises a channel control, volume control, and display format control. In an embodiment, the television signal comprises an analog television signal ranging from 40 MHz to 960 MHz. The television signal may also comprise a digital signal configured in one of a plurality of formats selected from DVB-T, DVB-S, ATSC, DMB-T, CMMB, and T-DMB. The content comprises a video file. The content may also comprise an advertisement. The content may comprise messaging. The content can be from a social network. The content may comprise a gaming application.

The configurable content objects can be provided in one or more memories of the mobile communication device upon sale of the mobile communication device. One or more of the configurable content objects can be updated via a worldwide network of computers coupled to a configurable content object database. One or more of the configurable content objects can be removed.

A user can select another channel from the plurality of channels. In an embodiment, the method includes transferring feedback information from the user, and the feedback information is associated with the selected configurable content object. The updating one or more of the configurable content objects is performed via a worldwide network of computers coupled to a content server.

According to another embodiment, the present invention provides a mobile communication apparatus. The apparatus includes a processor, a transmitter/receiver device coupled to the processor, a TV tuner coupled to the processor. The apparatus also includes one or more computer readable memories that are coupled to the processor. The apparatus includes a configurable content database comprising a plurality of configurable content objects. The apparatus also includes a presentation criteria database comprising a plurality of presentation criteria. The apparatus further includes a channel selector configured to initiate transfer of either one of a plurality of TV channels or at least one of the configurable content objects.

The selected configurable content object comprises a file format, which can be from bmp, JPEG, GIF, or other formats.

According to yet another embodiment, the present invention provides a method for operating a mobile communication device that configured for outputting a television application and operating selected action objects within a television environment of the mobile communication device. The method includes initiating a TV application using a user interface coupled to the mobile communication device. The method also includes capturing a television signal using a tuning device provided in the mobile communication device. The television signal is one of a plurality of television signals from respective television channels. The method also includes outputting a TV program associated with the television signal for the captured television channel on a display of the mobile communication device. The method includes retrieving a configurable action object from a database provided within the mobile communication device. The configurable action object is one of a plurality of configurable action objects numbered from 1 through N, where N is an integer greater than 1. The method includes associating the configurable action object to one of a plurality of the television channels using one of a plurality of presentation criteria. The plurality of presentation criteria is provided within the mobile communication device. The method includes outputting content from the configurable action object when a user selects a channel associated with the configurable action object. The channel is one of the plurality of channels. The method also includes initiating a selection associated with the configurable action object.

The TV application comprises a channel control, volume control, and display format control. The television signal comprises an analog television signal can range from 40 MHz to 960 MHz. The television signal comprises a digital signal configured in one of a plurality of formats selected from DVB-T, DVB-S, ATSC, DMB-T, CMMB, and T-DMB. The content may comprise a video file, an advertisement, messaging, gaming application, or others. For example, the content is from a social network.

The configurable action objects is provided in one or more memories of the mobile communication device upon sale of the mobile communication device. The configurable action objects are updated via a worldwide network of computers coupled to a configurable content action database.

According to yet another embodiment, the present invention provides a mobile communication apparatus. The apparatus includes a processor, a transmitter/receiver device coupled to the processor, and a TV tuner coupled to the processor. The apparatus also includes one or more computer readable memories coupled to the processor. The apparatus includes a configurable content database comprising a plurality of configurable action objects. Additionally, the apparatus includes a presentation criteria database comprising a plurality of presentation criteria. The apparatus further includes a channel selector configured to initiate transfer of either one of a plurality of TV channels or at least one of the configurable action objects. The apparatus additionally includes an action object selector configured to interface between the configurable action object and a user.

It is to be appreciated that through one or more embodiments, many benefits are achieved, as explained below. There are other embodiments as well.

DETAILED DESCRIPTION OF THE INVENTION

The present invention is directed to mobile television. More specifically, embodiments of the present invention provide a system for dynamically inserting content information into mobile TV applications. Based on various criteria (such as user history), content information such as relevant commercials are dynamically inserted into a mobile TV application, and such content information is display when a user changes channel and/or perform other actions. There are other embodiments as well.

Figure 1:
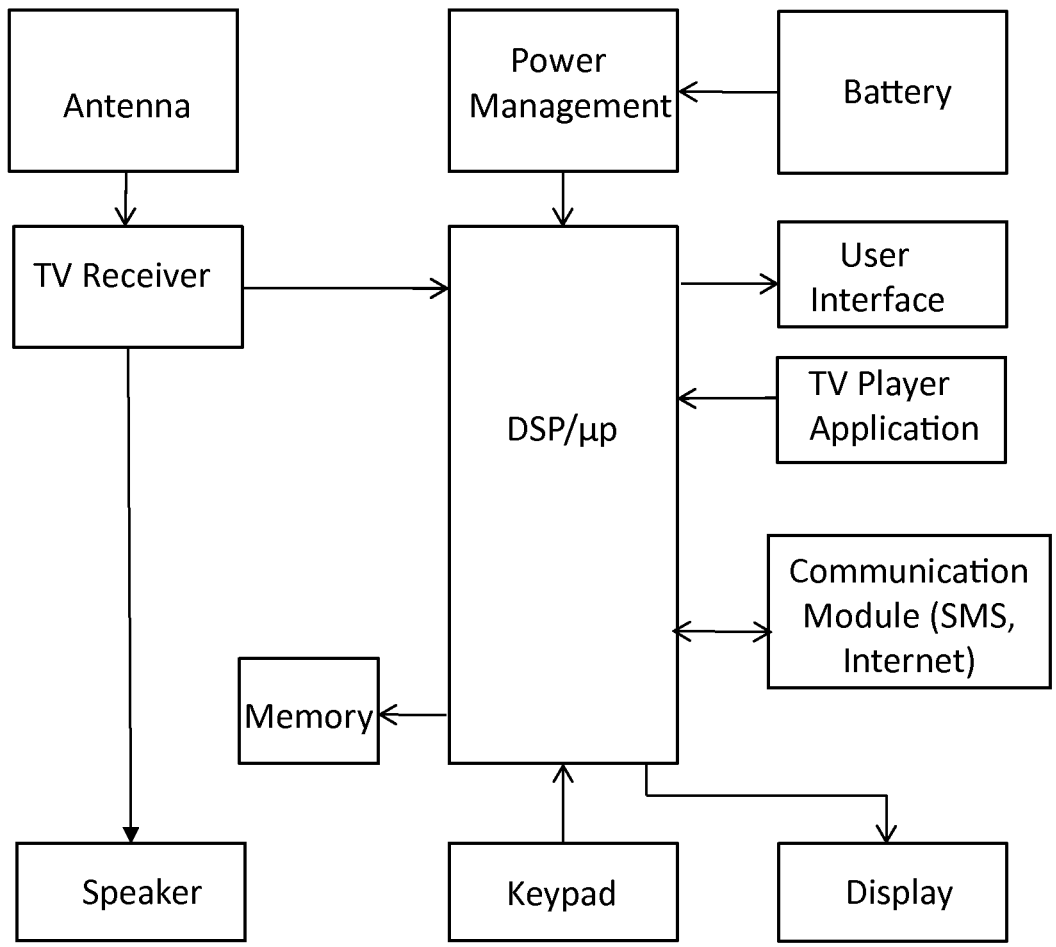
FIG. 1 is a simplified diagram of a mobile communication device configured with a television application according to an embodiment of the present invention.

FIG. 1 is a simplified diagram of a mobile communication device configured with a television application according to an embodiment of the present invention. This diagram is merely an example, which should not unduly limit the scope of the claims. One of ordinary skill in the art would recognize many variations, alternatives, and modifications. As shown in FIG. 1, a mobile device comprises a digital signal processing (DSP) microprocessor. Among other things, the DSP microprocessor is configured to process television signals for displaying on the display, which is also connected to the DSP microprocessor. The DSP microprocessor is connected to a user interface. A user can use the user interface to enter information using the keypad to make selections and view user selection and other information through the user interface. Depending on the application, the user interface may include a touch screen, and/or others. For example, a user uses the user interface to select the television channel that she desires to watch.

The DSP microprocessor is powered by a battery. As shown in FIG. 1, the DSP microprocessor is connected to the battery thorough a power management module. Depending on the application, the power management module can be implemented as an integrated part of the DSP microprocessor chip. Among other features, the power management helps reduce power consumption of the DSP microprocessor and/or other components of the mobile device.

The mobile device comprises a TV receiver. The TV receiver is coupled to an antenna as shown. Through the antenna, the TV receiver obtains television signals over air. For example, the television signals can in various formats. In various embodiments, the TV receiver processes television signals and sends the television signals to the DSP microprocessor. The display, which is connected the DSP, can be used to play television signals received by the TV receiver. In an embodiment, the TV receiver is an integral component of the DSP microprocessor. As an example, the TV receiver may be a chip sold by Telegent Systems, Sunnyvale, Calif. Telegent Systems sells high-performance, single-chip products that enable the reception of free-to-air broadcast television in mobile handsets, laptops, and other portable devices. These chips support both analog and digital broadcast standards. The chips support multiple broadcast standards, including DVB-T, ISDBT, CMMB, SECAM, PAL and NTSC.

The DSP microprocessor is connected to a memory. Among other things, the memory stores user information and past preferences. For example, user history, contact list, configuration data, and other information are stored at the memory. Depending on the application, the memory can be implemented in various ways. In an embodiment, the memory comprises flash memory for storing information.

An SMS module is also utilized. SMS is a text communication service component that uses standardized communications protocols that allow the exchange of short text messages between fixed line or mobile phone devices. The SMS module is configured to support standard texting operations. In addition, the SMS module is configured to process advertisement content, as discussed below.

The mobile communication also includes a keypad. In an embodiment, the keypad includes a TV on button, which invokes the pre-loaded advertisement module and activates the TV receiver.

Figure 2:
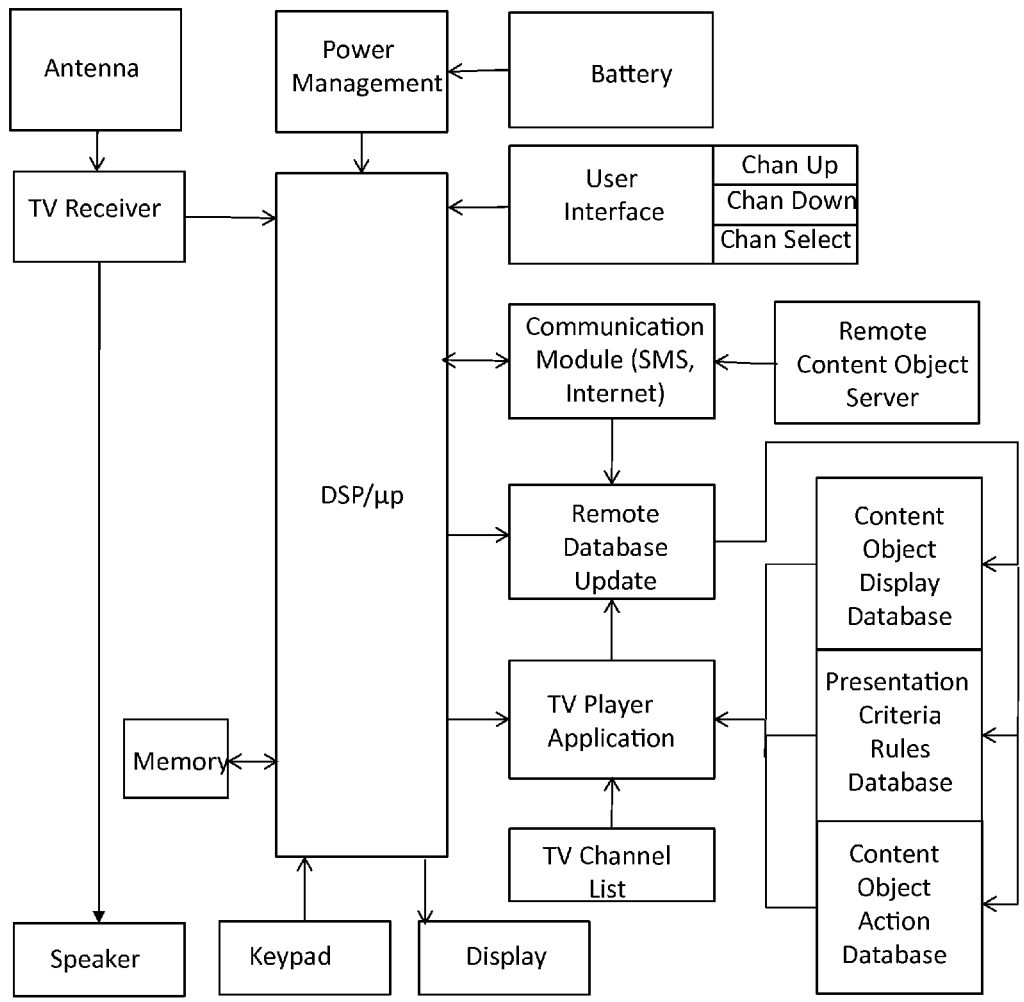
FIG. 2 is a detailed block diagram of the mobile communication device of FIG. 1.

FIG. 2 is a detailed diagram of a mobile communication device that includes an embodiment of the present invention. The diagram is an illustrative example, which should not unduly limit the scope of these claims. One of ordinary skill in the art would recognize many variations, alternatives, and modifications. FIG. 2 extends FIG. 1 to show the TV Player application makes use of a TV Channel list to decide which TV channels are available for viewing on the display and speaker. A series of databases are present on the mobile communication device, which contains configurable content data that may be displayed and acted upon by the TV player when selected. The Content Object Display database contains the content to be viewed or otherwise presented to the user on the display and speaker. Each configurable content object in the database has a set of rules defined in the Presentation Criteria database. These rules govern when the TV player may select a given configurable content object for presentation on the mobile communications device display and speaker. Furthermore, each Configurable Content object may have an optional action described in the Content Object Action database. The action defines some function that is ancillary to the Configurable Content object's presentation that may be executed on the content object's behalf by the TV Player when selected to do so by the viewing user.

The DSP microprocessor is configured to perform a variety of tasks, which include running a TV player application. For example, the TV player application can be a software module that is executed by the DSP microprocessor. The TV player application, among other features, plays television channels using the signals received by the TV receiver. In an embodiment the DSP microprocessor may also run a Remote Database Update application which communicates over a communication network with a remote database server to dynamically obtain new Configurable Content Object data, Presentation Criteria rules, and Content Object Actions.

In various embodiments, the TV player application is configured to determine a set of presentation criteria based various factors (such as location of the mobile device, last channel viewed, etc.). Using the presentation criteria, the TV player application obtain a content that is to be displayed when user changes TV channel and/or perform other actions. As an example, presentation criteria in the present application refers to current date and time of day of the mobile communications device, the mobile communication device's geographic location, the mobile communication device user's personal interests and characteristics, the mobile communication devices TV watching habits, but it is understood the user of the term should not unduly limit the scope of claims.

It is to be understood that the mobile device as illustrated in FIGS. 1 and 2 are not limited to mobile TV playback. As an example, the mobile device is a communication device that can be used as a cell phone or network-enabled device. The mobile device includes a communication module. For example, the communication module is configured for connecting to a wireless network, and through the connection between the communication module and the wireless network, the mobile device can connect to the Internet, send and receive text (e.g., SMS) messages, and/or perform other functions. For example, the mobile device may receive location information through the wireless network. In various embodiments, the TV player application selects contents to be display to the user based on information received from a database through the communication module.

To merely provide an example, the mobile device illustrated in FIG. 2 is a mobile phone that is capable of receive and play TV broadcast. The mobile phone is powered by the battery and its power is managed by the power management. Using the antenna and the TV receiver, the mobile receives television signals for a number of channels. Using the user interface and the keypad, a user selects a television channel. The selected television channel is displayed by the display and the speaker. The channel selection and/or other user inputs are stored by the memory. In an embodiment, a set of presentation criteria is determined by the DSP microprocessor based on, among other things, the current date, time-of-day, and geographic location of the mobile device. When the user uses the keypad to change channels, the presentation criteria selects the dynamically generated content to be displayed on the display. For example, the dynamically generated content is an ad. The user can select the ad and view additional information associated with the ad. The dynamically generated content can also be a channel list that is generated based on the presentation criteria. For example, if the current channel is news, the dynamically generate content contains a list of channels that include news and weather channels.

In another embodiment the mobile device communicates to a database through the communication module. From the database, the mobile device receives a dynamically generated content that is to be displayed when user changes television channel or perform other actions.

Figure 3:
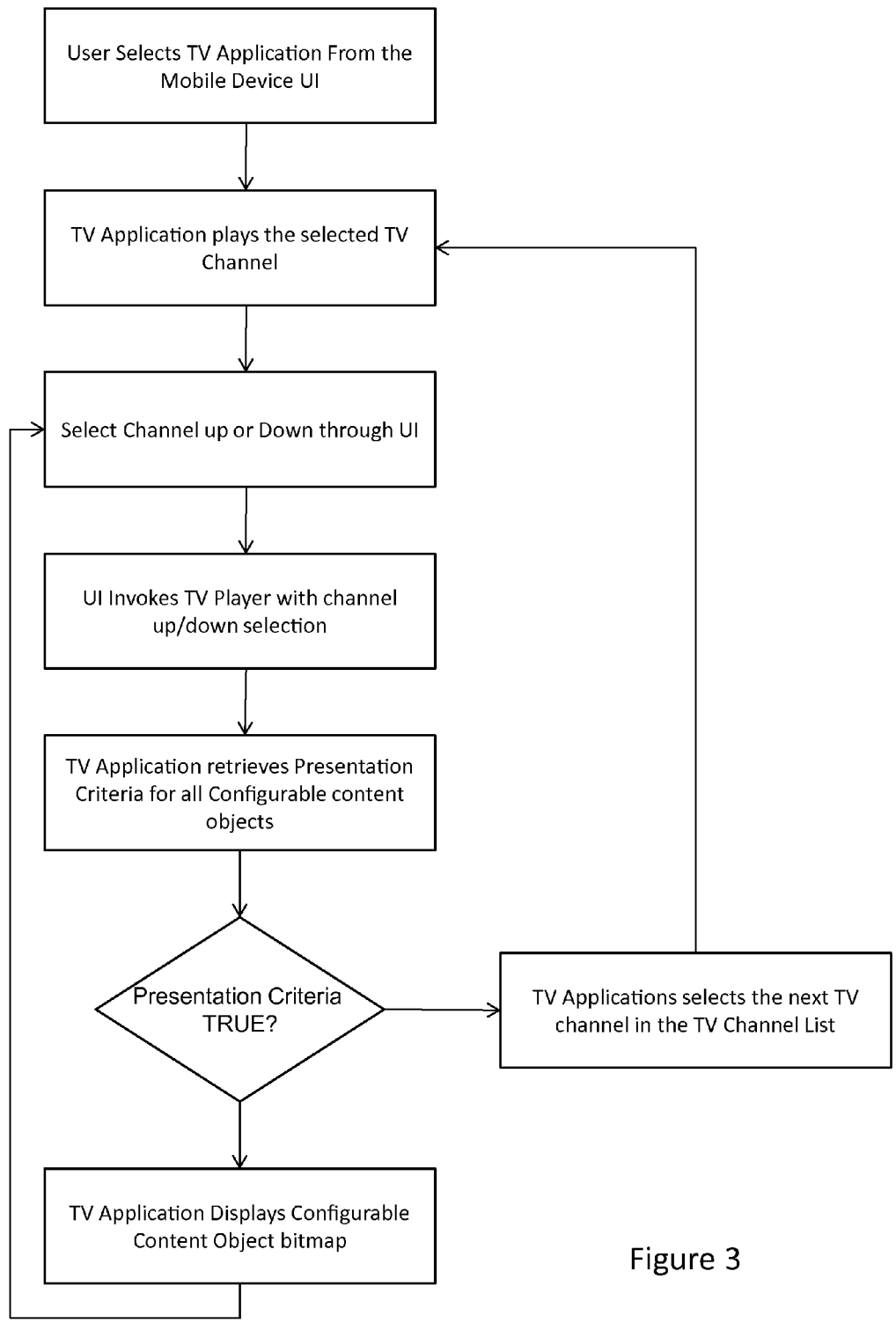
FIG. 3 is a simplified flow diagram of an object insertion method of operating a mobile communication device configured with a television application according to an embodiment of the present invention.

FIG. 3 illustrates processing options associated with an embodiment of this invention. The user of the mobile device, using its User Interface selects the TV Application from its available services. This diagram is merely an example, which should not unduly limit the scope of the claims herein. One of ordinary skill in the art would recognize other variations, modifications, and alternatives. The TV application runs and begins to display the selected TV channel. Through the use of the User Interface, touchscreen, or keypad the user may make new channel selection request to the TV application. The TV application examines the presentation criteria associated with all configurable content objects in the Content Object database. In this example the Presentation Criteria may be "display content object X at 4:00 pm today". The TV application will continue to process and display new channel requests until one of the presentation criteria becomes matches the current state of the mobile device. At that point the TV application will present the configurable content object associated with the matching presentation criteria. The user may continue to generate new channel requests and the process described above will continue.

Figure 4:
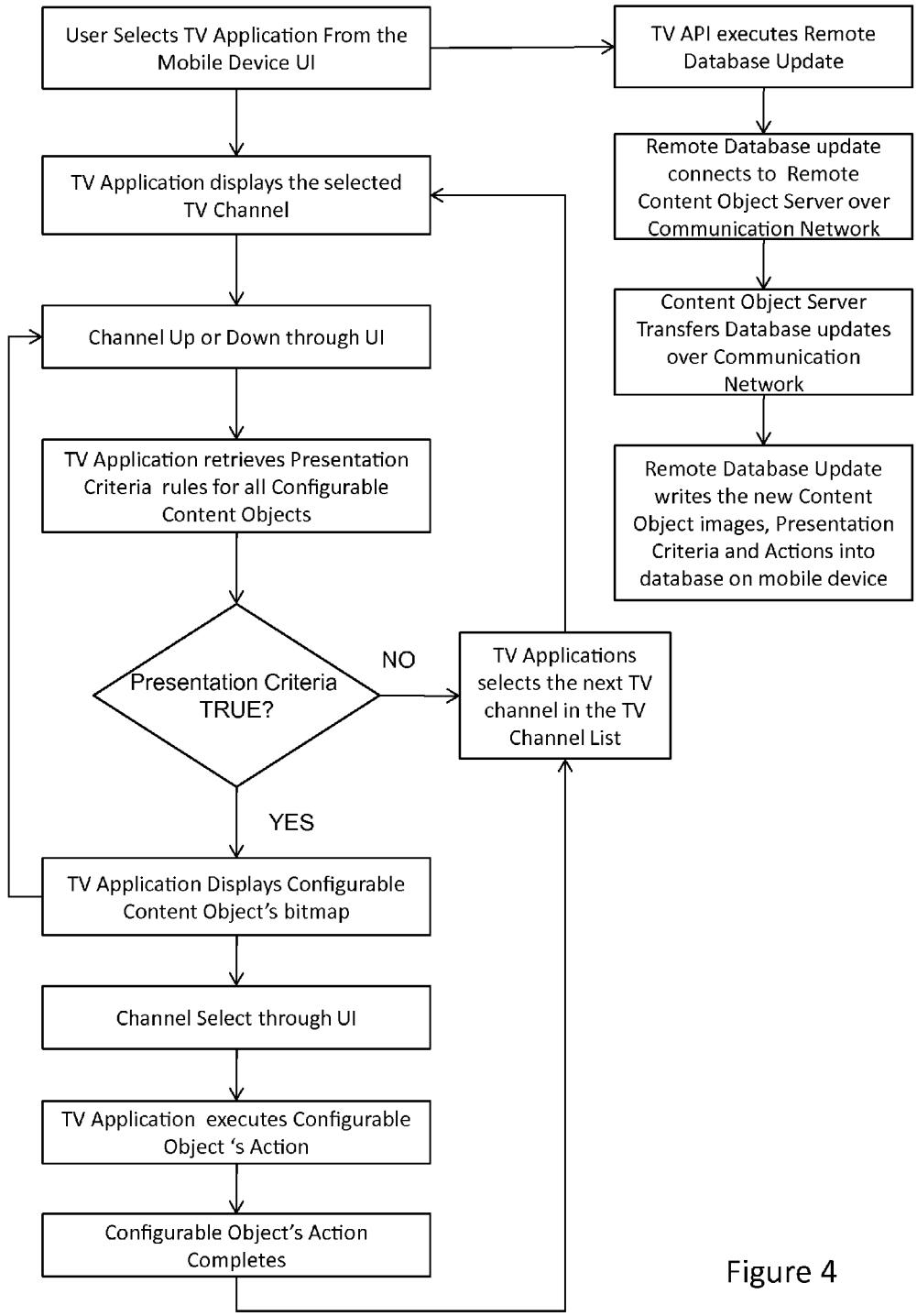
FIG. 4 is a simplified diagram illustrating displays according to an embodiment of the present invention.

FIG. 4 illustrates processing options associated with another embodiment of this invention. This diagram is merely an example, which should not unduly limit the scope of the claims herein. One of ordinary skill in the art would recognize other variations, modifications, and alternatives. The user of the mobile device, using its User Interface selects the TV Application from its available services. The TV application runs and begins to display the selected TV channel. It also initiates the Remote Database Update application to run. Through the use of the User Interface, touchscreen, or keypad the user may make new channel selection request to the TV application. The TV application will examine the presentation criteria associated with all configurable content objects in the Content Object database. In this example the Presentation Criteria may be "display content object X if the mobile device is in the country Greece". The TV application will continue to process and display new channel requests until one of the presentation criteria becomes matches the current state of the mobile device. At that point the TV application will present the configurable content object associated with the matching presentation criteria. In this example, the content object is an ad for a game application. The user wishes to play the game so he selects the game using the mobile device's User Interface, keypad, or touchscreen. The TV application searches the Content Object Action database and starts the associated application. When the user is done the mobile device returns control to the TV application. The user may continue to generate new channel requests and the process described above will continue. At some point the Remote Database Update application will run on the DSP microprocessor. It will connect to the Remote Database using a communications network such as, but not limited to, the internet or SMS. It will retrieve new configurable content objects and their associated presentation criteria and action data and put them in the appropriate databases on the mobile device.

Figure 5:
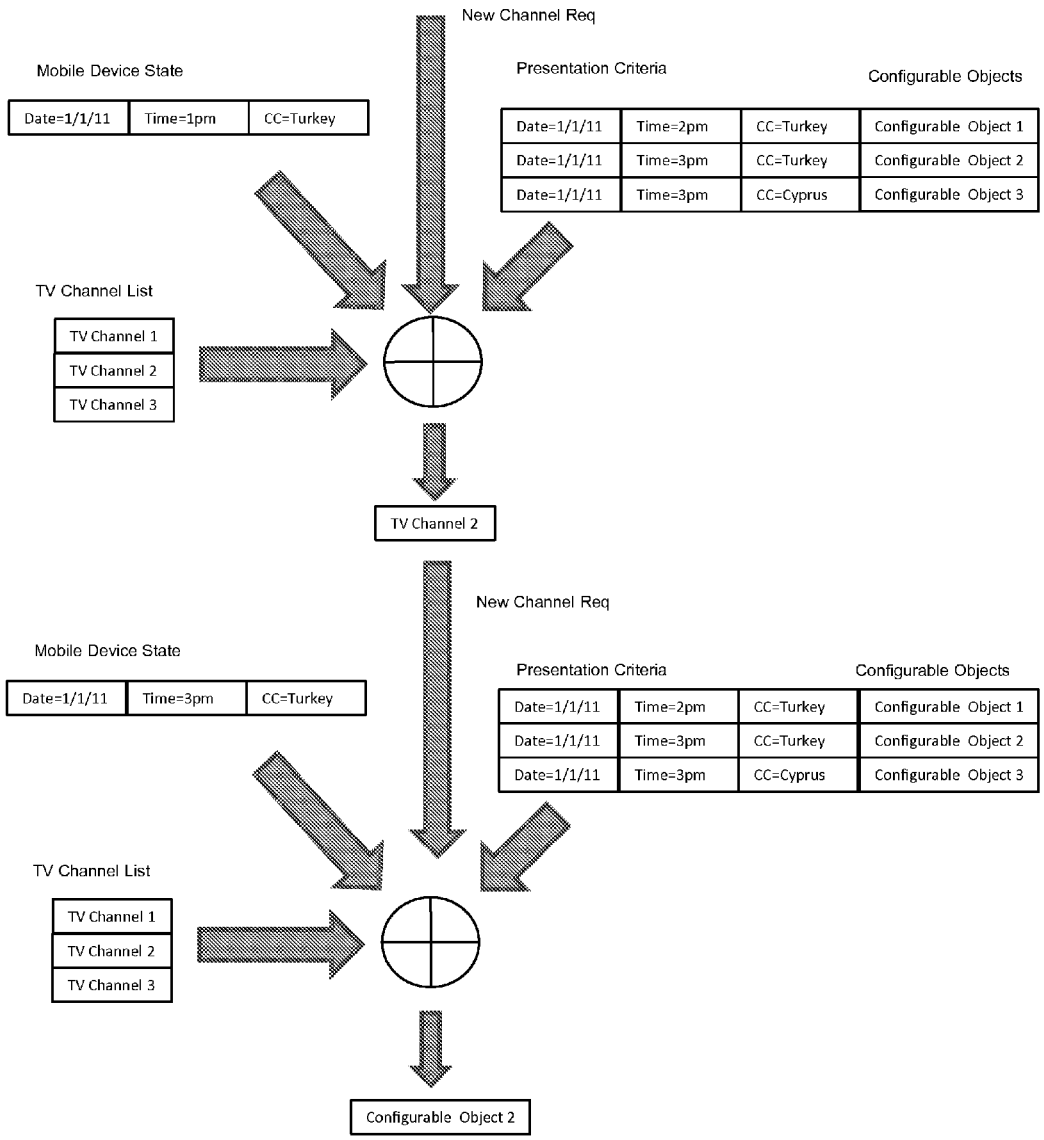
FIG. 5 is a detailed flow diagram illustrating an object insertion process according to an embodiment of the present invention.

Configurable Content Objects are selected for presentation to users as channels based on the Presentation Criteria associated with each Content Object. Presentation Criteria are a set of rules that are compared against the real-world state of the mobile device. Examples of real-world data that is compared against the Presentation Criteria rules are current date, current time of day, country that the mobile device currently resides in, number of TV channels currently watched, number of minutes of TV watched today. These are just examples and other examples exist and should not limit the validity of this patent. Each time a new channel is requested by the user the current real-world state of the mobile-device is compared with the Presentation Criteria rules database. When no Presentation Criteria rules are matched by the mobile devices state the TV application will play the TV channel from the TV Channel List. At some point a channel request will occur when the mobile device's state will match the rules in the Presentation Criteria and the TV application will select the associated Content Object and display it. As an example, FIG. 5 illustrates processing options for another embodiment of this invention that illustrate how Presentation Criteria may be used to decide when Configurable Object Content is presented and how it is selected. In this embodiment the Presentation Criteria used are current date and time of day for the mobile device, and current country the mobile device resides in. There could be other criteria as well.

In various embodiments, the presentation criteria and the rules for using presentation criteria can be stored at the mobile devices and/or obtained from a remote online network. In an embodiment, a mobile device receives presentation criteria and dynamic contents from a remote server. For example, the Presentation Criteria is a collection of attributes whose combined state defines the state of the ES as a whole. An attribute is considered active if its condition is true. For example if the Time-of-Day range is noon to midnight and the current time is 2 pm, the Time-of-Day attribute is active. An attribute is considered inactive if its condition is false but it can transition back to true. For example if the Time-of-Day range is noon to midnight and the current time is 10 am then the Time-of-Day attribute is inactive since it will become active later in the day. An attribute is considered expired if its condition is false and it will never transition back to true. For example, if the Date Range is Nov. 3, 2010-Nov. 12, 2010 and the current date is Nov. 24, 2010 then the condition is false and will never be true again, so the attribute's state is expired.

Table 1 as shown below is an exemplary list of presentation criteria:

TABLE 1

| PC Attribute | Description | Active | Inactive | Expired |
| --- | --- | --- | --- | --- |
| Date Range | Range of dates for which ES is active. | ✓ | | ✓ |
| Time of Day | Range of time for which ES is active. | ✓ | ✓ | |
| Geographical Area | Location for which ES is active | ✓ | ✓ | |
| Frequency of Presentation | How often the ES should appear at the given channel rank. | ✓ | ✓ | |
| Max Presentations allowed | Number of presentations before ES expires. | ✓ | | ✓ |
| Max Presentations allowed per day | Number of active presentations per day. | ✓ | ✓ | |
| Max Actions allowed | Number of times action be selected before ES expires. | ✓ | | ✓ |
| Channel Rank | Rank within Channel List ES to be presented. | ✓ | | |
| Channel Rank Priority | Priority among other ES at the same rank. | ✓ | | |

Date Range

This attribute is a single range of the form: start date-end date. If the current date falls within this range inclusive, then this attribute is active. Otherwise its expired. There is also a way to specify "all dates are valid".

Time of Day

This attribute is a single range of the form: start time-end time. If the current time falls within this range inclusive, then this attribute is active. Otherwise its inactive until the time once again falls within range. There is also a way to specify "all times are valid".

Geographical Area

This attribute defines the geographical region(s) for which this ES is active. If the device is not in the proper geographical area this attribute is inactive. There is also a way to say "all geographical regions are valid".

Frequency of Presentation

This attribute defines how often the given ES should be presented to a viewer. This is used primarily for autonomous presentations that occur during channel surfing or the startup screen. There is a way to say "no frequency limit".

Max Presentations Allowed

This attribute defines the maximum total number of presentations allowed for the ES before it expires. There is a way to say "infinite".

Max Presentations Allowed per Day

This attribute defines the maximum number of presentations per 24 hour period allowed for the ES before it is inactive for the remainder of the day. There is a way to say "infinite".

Max Actions Allowed

This attribute defines the maximum number of Selection Actions that the ES may have before it expires. There is a way to say "infinite".

Channel Rank

This attribute defines the rank of the ES. The Rank tells the TV player where to place the ES within the channel map or other display resources (e.g. startup splash screen). The rank should be divided into ranges of values, each range defining a class of service such as:

Rank to define Startup Screen

Ranks to define order in Channel Map (defines service as a Channel Map ES)

Ranks to define Interstitial Services (defines service as an Interstitial ES)

An interstitial service is one that appears during channel surfing but not part of the channel map itself.

Because of the special nature of the Startup Splash Screen, only Splash Screen ES may be used.

Channel map isn't an absolute position in the channel map. Rather it determines its position in the list relative to the other TV channels and services. ES in the channel map should be mingled not separated. Otherwise customers may avoid them.

The Channel Rank attribute is in the active state.

Channel Rank Priority

This attribute defines the priority of the ES among all ES at the same rank. This is used to establish a presentation selection order when there are several ES defined to have the same rank. If two ES have the same Rank and Priority the selection order between them is undefined and is implementation dependent.

The Channel Rank Priority attribute is in the active state.

It is to be under that the presentation criteria as shown in Table 1 and explained above only serve as an example. There can be other presentation criteria as well, and presentation criteria can be used differently as well.

Figure 6:
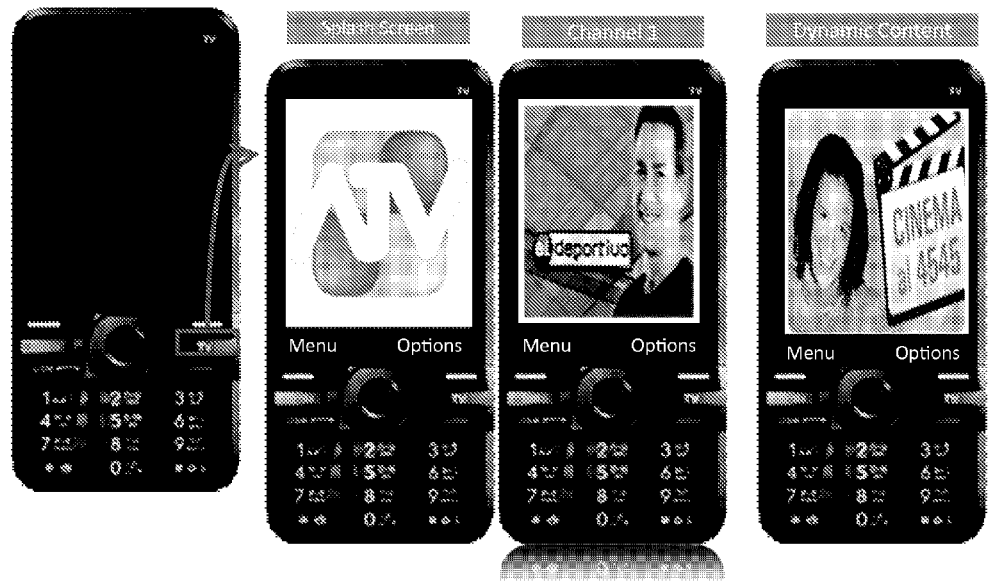
FIG. 6 is a simplified diagram illustrating inserting dynamically generated content to channel selection processes according to an embodiment of the present invention.

FIG. 6 is a simplified diagram illustrating inserting dynamically generated content to channel selection processes according to an embodiment of the present invention. This diagram is merely an example, which should not unduly limit the scope of the claims. One of ordinary skill in the art would recognize many variations, alternatives, and modifications. As shown in FIG. 6, a mobile phone is turned on by a TV button. When the TV application launches, a splash screen appears the mobile phone display. Upon user selection, channel 1 played back. When the user changes channel (e.g., pressing menu selection key), a dynamically generated content is displayed. As explained above, the dynamic content may be generated by using the presentation criteria.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method for operating a mobile communication device configured for outputting a television application and displaying selected content within a television environment of the mobile communication device, the method comprising:

initiating a TV application using a user interface coupled to the mobile communication device;

capturing a television signal using a tuning device provided in the mobile communication device, the television signal being one of a plurality of television signals from respective television channels;

outputting a TV program associated with the television signal for the captured television channel on a display of the mobile communication device;

retrieving a configurable content object from a database provided within the mobile communication device, the configurable content object being one of a plurality of configurable content objects numbered from 1 through N, where N is an integer greater than 1;

associating the configurable content object to one of a plurality of the television channels using one of a plurality of presentation criteria, the plurality of presentation criteria being based on the configurable content object and a real world state of the mobile communication device;

displaying a dynamically generated content based on the configurable content object on the display when a user selects a new channel associated with the configurable content object, the new channel being one of the plurality of channels, the dynamically generated content and the TV program not being displayed contemporaneously;

displaying a new TV program associated with the new channel after displaying the dynamically generated content.

2. The method of claim 1 wherein the TV application comprises a channel control, volume control, and display format control.

3. The method of claim 1 wherein the television signal comprises an analog television signal ranging from 40 MHz to 960 MHz.

4. The method of claim 1 wherein the television signal comprises a digital signal configured in one of a plurality of formats selected from DVB-T, DVB-S, ATSC, DMB-T, CMMB, and T-DMB.

5. The method of claim 1 wherein the content comprises a video file.

6. The method of claim 1 wherein the content comprises an advertisement.

7. The method of claim 1 wherein the content comprises messaging.

8. The method of claim 1 wherein the content is from a social network.

9. The method of claim 1 wherein the content comprises a gaming application.

10. The method of claim 1 wherein the configurable content objects being provided in one or more memories of the mobile communication device upon sale of the mobile communication device.

11. The method of claim 1 wherein one or more of the configurable content objects are updated via a worldwide network of computers coupled to a configurable content object database.

12. The method of claim 1 further comprising removing one or more of the configurable content objects.

13. The method of claim 1 further comprising selecting another channel from the plurality of channels.

14. The method of claim 1 further comprising transferring feedback information from the user, the feedback information being associated with the selected configurable content object.

15. The method of claim 1 wherein updating one or more of the configurable content objects via a worldwide network of computers coupled to a content server.

16. The apparatus of claim 1 wherein the selected configurable content object comprises a file format, the file format being selected from bmp, JPEG, and GIF.

17. A mobile communication apparatus comprising:
   a processor;
   a transmitter/receiver device coupled to the processor;
   a TV tuner coupled to the processor;
   one or more computer readable memories, the one or more computer readable memories coupled to the processor;
   a configurable content database comprising a plurality of configurable content objects;
   a presentation criteria database comprising a plurality of presentation criteria based on the configurable content object and a real world state of the mobile communication device; and
   a channel selector configured to initiate transfer of either one of a plurality of TV channels or at least one of the configurable content objects;
   wherein a dynamically generated content based on the configurable content objects is displayed between a first TV channel and a second TV channel when the switching from the first TV channel to the second TV channel, the dynamically generated content and the first TV channel not being displayed contemporaneously.

18. The apparatus of claim 17 wherein the selected configurable content object comprises a file format, the file format being selected from bmp, JPEG, and GIF.

19. A method for operating a mobile communication device configured for outputting a television application and operating selected action objects within a television environment of the mobile communication device, the method comprising:
   initiating a TV application using a user interface coupled to the mobile communication device;
   capturing a television signal using a tuning device provided in the mobile communication device, the television signal being one of a plurality of television signals from respective television channels;
   outputting a TV program associated with the television signal for the captured television channel on a display of the mobile communication device;
   retrieving a configurable action object from a database provided within the mobile communication device, the configurable action object being one of a plurality of configurable action objects numbered from 1 through N, where N is an integer greater than 1;
   associating the configurable action object to one of a plurality of the television channels using one of a plurality of presentation criteria, the plurality of presentation criteria being based on the configurable content object and a real world state of the mobile communication device;
   displaying a dynamically generated content based on the configurable action object on the display when a user selects a new channel associated with the configurable action object, the new channel being one of the plurality of channels, the dynamically generated content and the TV program not being displayed contemporaneously; and
   initiating a selection associated with the configurable action object in response to a user selection of the configurable action object.

20. The method of claim 19 wherein the TV application comprises a channel control, volume control, and display format control.

21. The method of claim 19 wherein the television signal comprises an analog television signal ranging from 40 MHz to 960 MHz.

22. The method of claim 19 wherein the television signal comprises a digital signal configured in one of a plurality of formats selected from DVB-T, DVB-S, ATSC, DMB-T, CMMB, and T-DMB.

23. The method of claim 19 wherein the content comprises a video file.

24. The method of claim 19 wherein the content comprises an advertisement.

25. The method of claim 19 wherein the content comprises messaging.

26. The method of claim 19 wherein the content is from a social network.

27. The method of claim 19 wherein the content comprises a gaming application.

28. The method of claim 19 wherein the configurable action objects being provided in one or more memories of the mobile communication device upon sale of the mobile communication device.

29. The method of claim 19 wherein one or more of the configurable action objects are updated via a world-wide network of computers coupled to a configurable content action database.

30. The method of claim 19 further comprising removing one or more of the configurable action objects.

31. A mobile communication apparatus comprising:
   a processor;
   a transmitter/receiver device coupled to the processor;
   a TV tuner coupled to the processor;
   one or more computer readable memories, the one or more computer readable memories coupled to the processor;
   a configurable content database comprising a plurality of configurable action objects;
   a presentation criteria database comprising a plurality of presentation criteria;
   a channel selector configured to initiate transfer of either one of a plurality of TV channels or at least one of the configurable action objects; and
   an action object selector configured to interface between the configurable action object and a user;
   wherein a dynamically generated content based on the configurable content objects is displayed between a first TV channel and a second TV channel when the switching from the first TV channel to the second TV channel, the dynamically generated content and the first TV channel not being displayed contemporaneously.

* * * * *